T. J. E. ROBERTS AND H. G. BELGROVE.
SELF PROPELLED PLOW AND OTHER AGRICULTURAL MACHINE.
APPLICATION FILED NOV. 1, 1918.
1,372,455.
Patented Mar. 22, 1921.
3 SHEETS—SHEET 1.
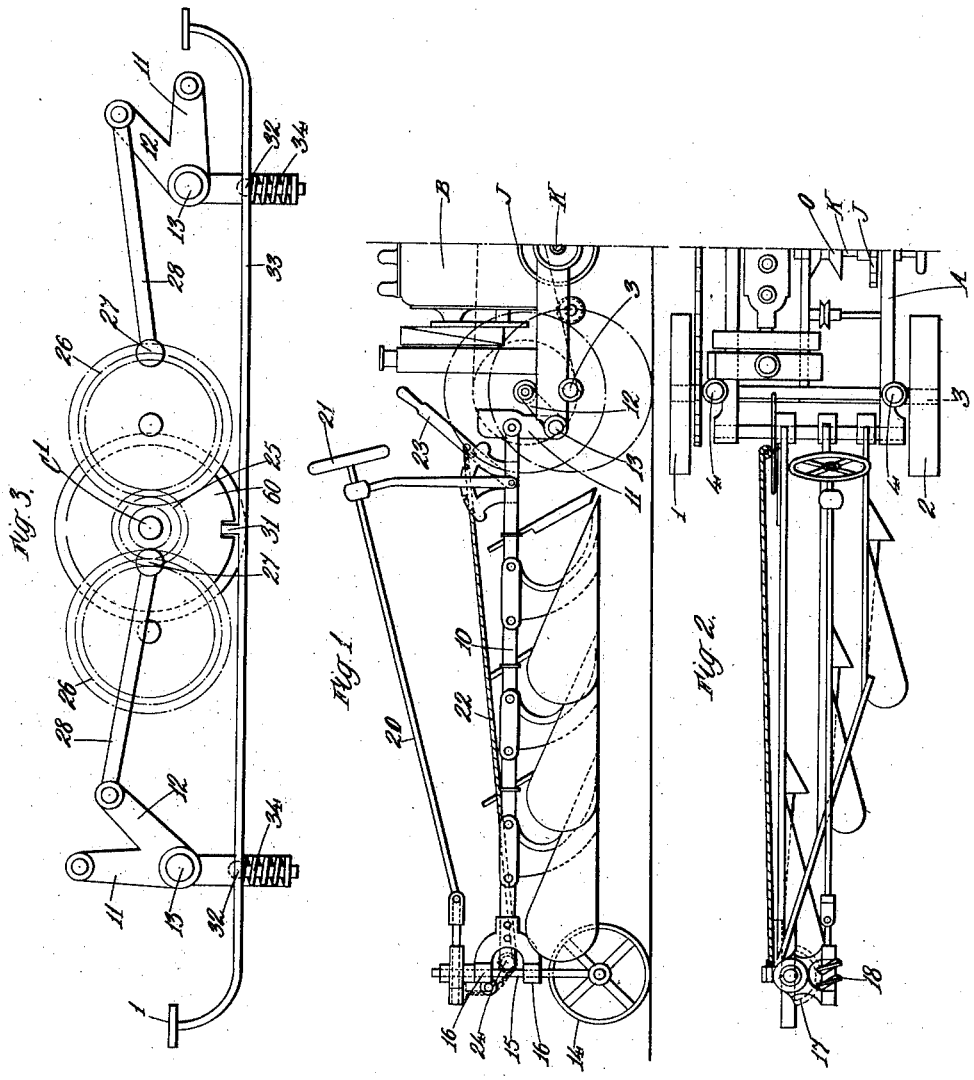

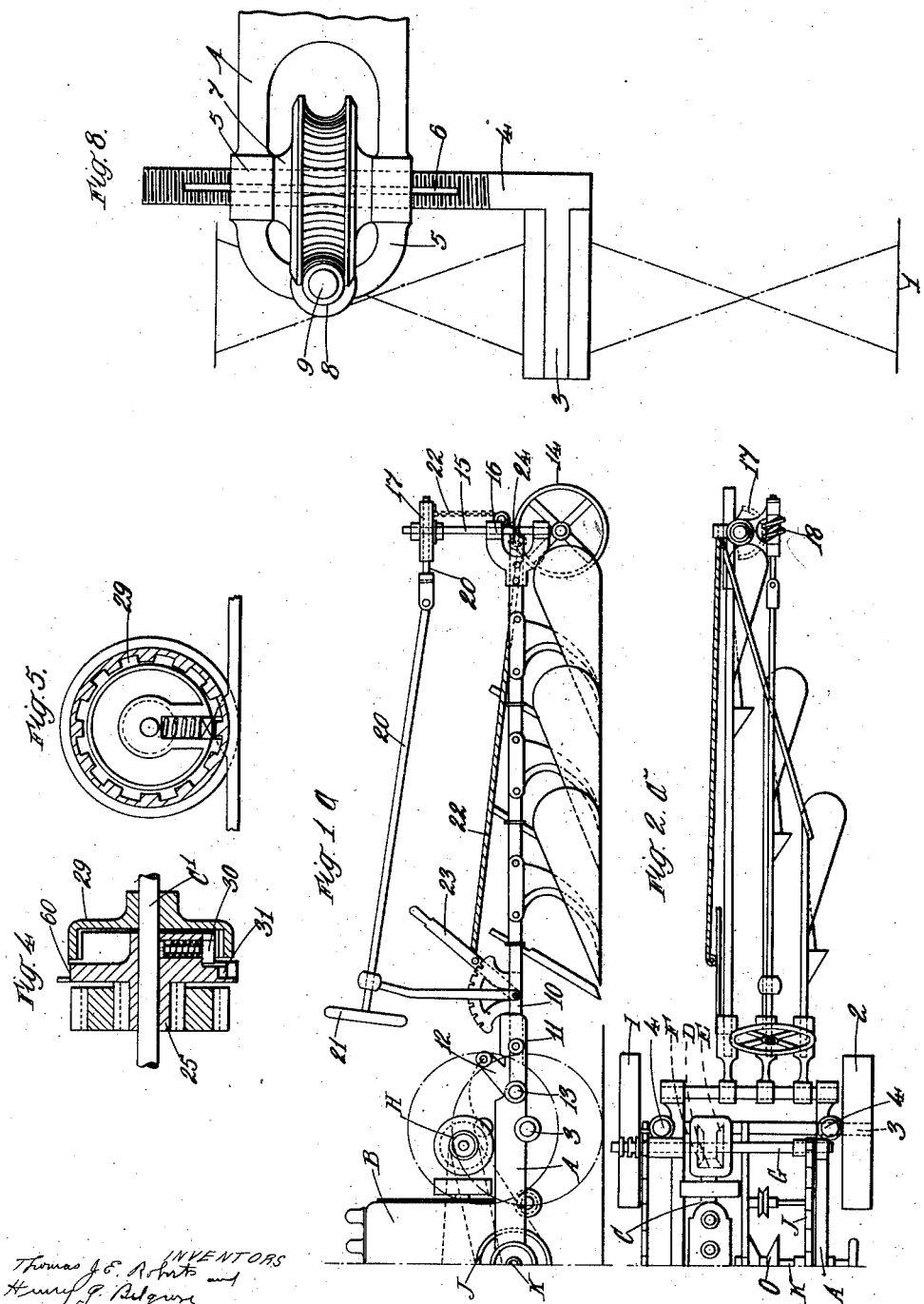

T. J. E. ROBERTS AND H. G. BELGROVE.
SELF PROPELLED PLOW AND OTHER AGRICULTURAL MACHINE.
APPLICATION FILED NOV. 1, 1918.
1,372,455.
Patented Mar. 22, 1921.
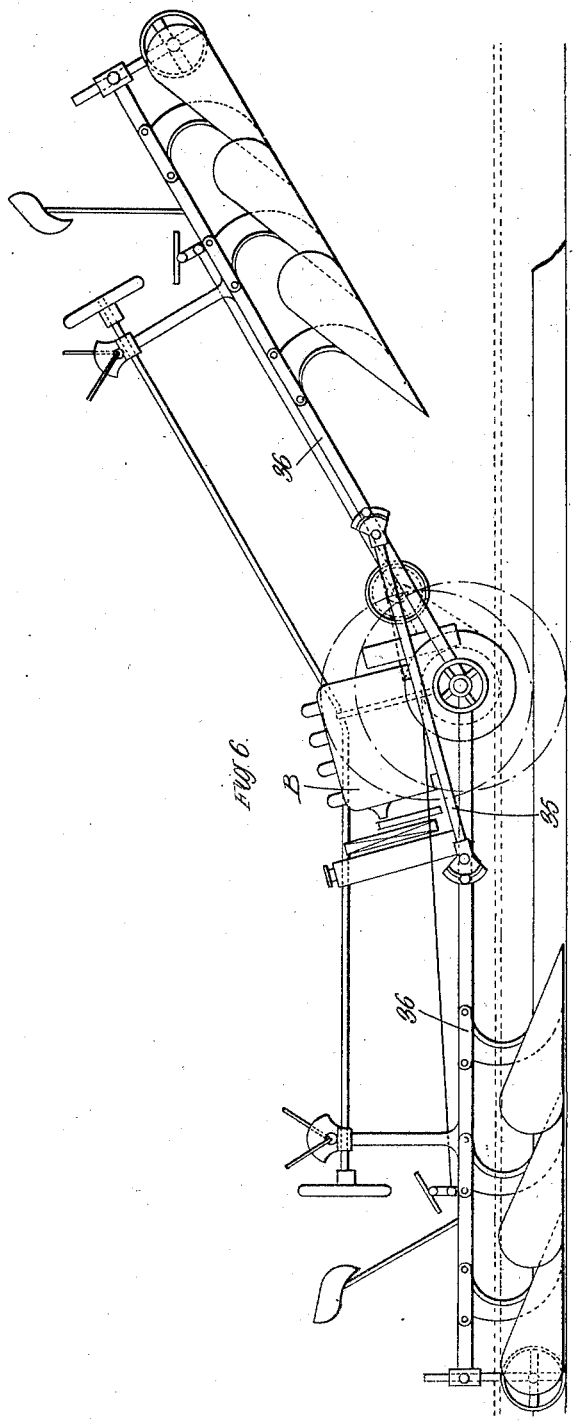
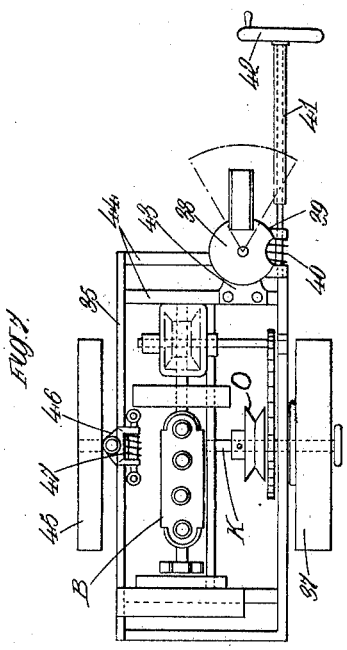

UNITED STATES PATENT OFFICE.

THOMAS JOHN EDWIN ROBERTS, OF STONY STRATFORD, AND HENRY GEORGE BELGROVE, OF DENTON, ENGLAND.

SELF-PROPELLED PLOW AND OTHER AGRICULTURAL MACHINE.

1,372,455.     Specification of Letters Patent.     Patented Mar. 22, 1921.

Application filed November 1, 1918. Serial No. 260,726.

*To all whom it may concern:*

Be it known that we, THOMAS JOHN EDWIN ROBERTS and HENRY GEORGE BELGROVE, both subjects of the King of Great Britain, residing, respectively, at Stony Stratford, in the county of Bucks, England, and at Denton, in the county of Northampton, England, have invented new and useful Improvements in Self-Propelled Plows and other Agricultural Machines, of which the following is a specification.

This invention relates to self propelled plows and other agricultural machines, such as seed drills, disk harrows and the like which are required at each traverse of a field to move along a new line parallel to that previously traversed, and the invention has for its object to provide an improved agricultural machine of this type.

In a machine made in accordance with this invention the motor mounted in the machine serves to drive the haulage capstan, and also to actuate mechanism for changing the plow or other frames at the headlands, and the said motor may also serve for operating the land wheels when it is desired to convert the machine temporarily into a tractor for moving from field to field or for other purposes.

Generally described the improved machine comprises a motor (*e. g.* an internal combustion engine) mounted on the machine and adapted to drive a haulage capstan drum which may be of the variable diameter type as described in our application No. 260,725, November 1, 1918, so that with a constant speed of the motor the speed of the machine can be varied by varying the diameter of the capstan. In combination with the variable diameter capstan suitable tension pulleys are provided to insure that that part of the cable which is around the capstan drum shall be under sufficient tension to prevent slip. If desired means may be provided for moving apart or disconnecting from the capstan the friction or tension chassis in advance so that they act only as guide pulleys for the time being, this arrangement being combined with and operated by the mechanism for reversing the direction of rotation of the capstan or for changing the plow or other frames to suit the new direction of motion when the machine reaches a headland.

The plow frames are connected to the chains at their inner ends by bell crank levers pivoted to the chassis and their other or outer ends are supported by the frames carrying the side wheels of the machine, and are raised and lowered therein by ropes or chains passing over a pulley and connected to the upper end of said frames the inner end of the rope being connected to a suitable hand lever.

The inner ends of the plow frames are raised and lowered through the bell crank levers by means of power from the motor acting through suitable trip gear comprising a gear wheel or pinion, which is rotatably mounted on or concentrically with the motor-shaft and which is normally prevented from rotating by means of a detent tooth or trip mounted midway between the fulcra of a double-fulcrum controlling lever, the fulcra of which are supported on springs and are arranged near the ends of the lever, so that by depressing either end of the lever the latter will turn about the fulcrum at the other end and the detent will be moved out of engagement with the gear wheel above mentioned.

In order to convert the machine into a tractive motor or independent self-propelled vehicle for moving from field to field or along roads by the adhesion of the land wheels on the surface, the motor is connected by chain, spur, worm or other gearing to one or more of such land wheels through a friction or other suitable clutch. The steering of the machines when traveling as a tractive motor is effected by means of levers mounted upon the upper ends of the vertical spindles carrying the axles of the land wheels whereby said land wheels may be moved to the right or to the left, the movement being controlled by wheels with suitable racks or connecting rods.

The land and furrow wheels are equally raised and lowered by means of suitable worm gear.

The wheels at the ends of the machine are used for steering when in work on the land, but one only is used at a time, viz. the one in front in the direction in which the machine is traveling for the time being the other wheel at the rear then acting simply as a trailer.

The invention may also be applied to plows of the balanced type in which case the internal combustion engine or other motor is mounted on a chassis to which are attached right and left handed plows of the balanced type i. e. when the capstan is hauling on to the anchored rope in one direction, the leading part of the plow is raised and inoperative and the trailing part is lowered and operative; when hauling in the other direction the part previously raised is lowered and becomes the operative one the other is raised and is inoperative. The capstan in either case may be advantageously driven through a gear box comprising a pair of bevel wheels driven by the motor through pinions controlled by a gear clutch which by engaging with one bevel wheel or the other, reverses the direction of rotation of a shaft that is connected e. g. by chain and sprocket gear to the capstan shaft. Between the engine and the bevel gearing there is preferably arranged a friction clutch which has foot controls at either end of the plow. The steering is done by means of one of the wheels on the chassis which runs for preference on the land through a worm and sector mounted on the vertical spindle carrying the axle upon which the wheel rotates. By a hand wheel placed at either end of the plow the direction of travel can be regulated.

By detaching the plows at the two points where they join the end of the chassis and by putting on a turntable plate with a suitable connection, this chassis can be used in conjunction with binders, mowers and any other agricultural implements which are now used with horse haulage. The turntable plate can be slid transversely to adjust it for the line of draft which it is required to obtain, the steering being effected by a worm and worm-wheel. To obtain the drive we use one land wheel which, when plowing, runs loose on the shaft but when used for traction purposes, e. g. by means of a pawl engaging with a ratchet wheel, the shaft becomes the driver, or if required for pulling and backing a pin can be passed through the plate on the traveling wheel into the disk of the chain wheel, thereby making it a solid drive. The steering is done by the turntable plate being fixed at either one angle or another so that the haulage is in the direction of the travel, doing away with any side pressure.

We will further describe the invention with reference to the accompanying drawings of which Figures 1 and 1ª are side elevations and Figs. 2 and 2ª are plans showing a plow having our invention applied thereto.

Figs. 3, 4 and 5 are respectively a side elevation a longitudinal section, and a transverse section drawn to an enlarged scale and illustrating the trip gear for raising and lowering the plow frames by the power of the motor.

Fig. 6 is a side elevation of a plow of the balance type having our invention applied thereto and Fig. 7 is a plan view of the middle part or chassis thereof.

Fig. 8 is an elevation showing the mechanism for raising and lowering the land and furrow wheels relatively to the chassis.

Referring to Figs. 1 to 5.

In the plow shown in Figs. 1 to 5 A is the chassis of the plow on which is mounted the one internal combustion engine or other motor B having a driving shaft C with bevel pinion D. Into engagement with this pinion there can be brought one or other of a pair of bevel wheels E, F which are movable along but rotate with a shaft G that is connected by chain and sprocket gear H, J to the capstan shaft K on which the variable diameter capstan O is mounted. By sliding the wheels E, F axially in one direction or the other the direction of rotation of the shaft G and capstan shaft K can be reversed as desired.

The land and furrow wheels 1, 1 2, 2 of the chassis A have their axles 3, 3 supported on vertical rods, 4, 4 (Fig. 8) which are provided with screw threads and are guided vertically in brackets 5, 5 on the chassis. Each of the rods 4, 4 is provided with a longitudinal slot 6, with which engage feathers on the brackets 5, 5, so as to prevent the rod from turning in its supporting brackets. Between each pair of brackets 5, 5, there is arranged a nut 7, the periphery of which is made in the form of a worm wheel to engage with a worm 8 mounted on a shaft 9. One worm shaft 9 is preferably provided for the worms controlling the land wheels 1, 1 and another for the worms controlling the furrow wheels 2, 2, so that the two land wheels can be raised and lowered simultaneously by equal amounts, and the two furrow wheels likewise.

The plow frames 10, 10 are connected to the chassis A at their inner ends by bell-crank levers 11, 12 which are pivoted at 13 to the chassis and have their arms 11 pivoted to the inner ends of the plow frames. The other or outer ends of the plow frames 10, 10 are supported by end wheels 14, 14 which are mounted on vertical rods 15, 15 slidable in brackets 16, 16 on the frames 10, 10 and provided at their upper ends with toothed sectors 17, 17 engaging with worms 18, 18 on jointed shafts 20, 20 provided with hand wheels 21, 21 so as to permit of the turning of the rods 15, 15 in order to guide the machine over the land. The outer ends of the frames 10, 10 are raised and lowered on the rods 15, 15 by means of chains or ropes 22, each connected at one end with a hand lever 23 and passing over guide-pulleys 24 to the upper end of the corresponding rod 15, to which it is suitably secured.

The inner ends of the plow frames 10, 10 are raised and lowered through the bell-crank levers 11, 12 by means of power from the motor B acting through trip gear comprising a pinion 25 which meshes on each side with a gear wheel 26 having double the number of teeth. The wheels 26 are each provided with a crank pin 27 connected by a link 28 to the arm 12 of the corresponding bell-crank lever, the crank pins 27, 27 being so arranged that when one of the plow frames is up, the other is down, and vice versa. Concentrically with the pinion 25 there is arranged an internally-toothed clutch member 29 which is fixed on a shaft $C^1$ driven by the motor. On the pinion 25 there is mounted a spring pawl 30, which is adapted to engage the teeth of the clutch member 29 and is normally held out of engagement with such teeth by means of a detent tooth or trip 31 mounted midway between the fulcra 32, 32 of a double fulcrum-controlling lever 33, each of said fulcra being supported on a spring 34. By depressing either end of the lever 33 the trip 31 will be moved out of engagement with the spring pawl 30, so as to allow the pawl to move into engagement with the teeth of the rotating clutch member 29 which consequently rotates the pinion 25 through one revolution and the gear wheels 26, 26 and crank pins 27, 27 through a half revolution, thus raising the plow frame that was lowered and lowering the one that was raised. When the pinion 25 has completed a revolution the pawl 30 thereon comes into engagement again with the trip 31 (the lever 33 having meanwhile been released) and is lifted by an incline on the trip out of engagement with the teeth of the clutch member 29, the trip 31 then entering a notch on a disk 60 integral with the pinion 25. The plow frames 10, 10 then remain in the position to which they have been moved, until the lever 33 is again actuated.

In the plow illustrated in Figs. 6 and 7 which is of the balanced type the chassis 35 carrying the motor B is detachably connected with the plow frames 32—36 and is adapted to be used separately for general haulage purposes. The capstan shaft K is then connected through suitable gearing and a ratchet or other clutch to the furrow wheel 37, this clutch being disengaged when the machine is arranged for plowing. When the disconnected chassis is used for haulage, the binder, mower or other agricultural implement to be drawn is connected thereto by means of a turntable plate 38, Fig. 7, which is adapted to be turned relatively to the chassis by means of a toothed sector 39 and a worm 40 mounted on a shaft 41 provided with a hand wheel 42. The turntable plate 38 is preferably rotatably mounted on a slide 43 which is movable along transverse guide bars 44, 44, on the chassis, to which it can be secured in any position to which it has been adjusted in order to bring it into the line of draft most suitable for the machine to be hauled.

When used for plowing, the chassis is connected with the plow frames 36, 36 and the steering is effected by means of the land wheels 45 which is mounted on a vertical rod or steering post and provided at its upper end with a toothed sector 46 engaging with a worm 47 on the shaft provided with a hand wheel.

It will be seen that in the type of machine shown in Figs. 6 and 7 the motor B is adapted to either haul the machine by the cable through the capstan or to drive the machine as a tractor through the land wheel 37.

Having now particularly described and ascertained the nature of our said invention and in what manner the same is to be performed, we declare that what we claim is:—

1. In an agricultural machine, a motor, a haulage capstan adapted to be driven by said motor, movable frames mounted on said machine, trip gear and cranks on said machine, said cranks being geared together and being adapted to be driven by said motor through said trip gear and link-work connecting said cranks with the inner ends of said frames and adapted to raise and lower said inner ends, substantially as set forth.

2. In an agricultural machine, a motor, a variable speed haulage capstan adapted to be driven by said motor, movable frames mounted on said machine, trip gear and cranks on said machine, said cranks being geared together and being adapted to be driven by said motor through said trip gear and link work connecting said crank with the inner ends of said frames and adapted to raise and lower said inner ends, substantially as set forth.

3. An agricultural machine, a motor, a haulage capstan adapted to be driven by said motor, movable frames mounted on said machine, trip gear and cranks on said machine, said cranks being geared together and being adapted to be driven by said motor through said trip gear and link-work connecting said cranks with the inner ends of said frames and adapted to raise and lower said inner ends, land and furrow wheels on said machine, screw-threaded spindles whereon said wheels are mounted, means for holding said spindles against rotation, combined nuts and worm wheels on said spindles, said combined nuts and worm wheels being rotatably mounted on said machine and interconnected worms for actuating said worm wheels, substantially as set forth.

THOMAS JOHN EDWIN ROBERTS.
HENRY GEORGE BELGROVE.